United States Patent Office 2,768,202
Patented Oct. 23, 1956

2,768,202
GLYCINAMIDE DERIVATIVES

Moses Wolf Goldberg, Upper Montclair, and Albert Israel Rachlin, Hackensack, N. J., assignors to Hoffmann-La Roche Inc., Nutley, N. J., a corporation of New Jersey No Drawing. Application April 12, 1955,
Serial No. 501,000

8 Claims. (Cl. 260—558)

This invention relates to derivatives of glycinamide. More particularly, this invention relates to glycinamide derivatives wherein each nitrogen atom bears lower alkyl groups or is part of a heterocyclic radical and, in addition, the basic nitrogen is further substituted with a benzyl group and an anion.

The compounds of this invention may be represented by the following structural formula

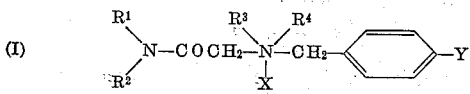

wherein (a) $R^1$ represents hydrogen or a lower alkyl group and $R^2$ represents a lower alkyl group, or (b) $R^1$ and $R^2$ taken together with the nitrogen atom, i. e. the group

represent a 5- or 6-membered saturated, monoheterocyclic radical, (c) $R^3$ and $R^4$ each represents a lower alkyl group, or (d) $R^3$ and $R^4$ taken together with the nitrogen atom, i. e. the group

represents a 5- or 6-membered saturated, monoheterocyclic radical, X represents an anion derived from an acid, Y represents a nitro or halogen group.

When the groups

and

in Formula I above represent primary lower alkylamino groups or secondary di-lower alkylamino groups, the lower alkyl groups contain preferably 1 to 6 carbon atoms, e. g., methylamino, ethylamino, dimethylamino, diethylamino, etc. The lower alkyl groups may be the same or different in a single compound. The heterocyclic radicals represented by the groups

and

include pyrrolidino, morpholino, piperidino and the like, preferably the three named. The anions represented by X include anions derived from acids such as the mineral acids, e. g. phosphoric acid, sulfuric acid and the hydrohalic acids. Especially preferred anions are the halogens chlorine, bromine and iodine.

Two preferred groups of compounds of this invention may be represented by the following Formulae II and III

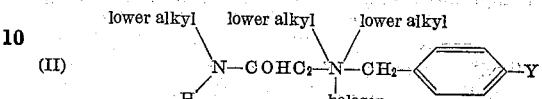

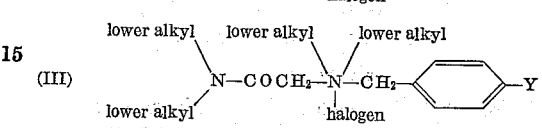

wherein Y has the same significance noted above and the term "lower alkyl" refers to lower alkyl groups having 1 to 6 carbon atoms. Y represents preferably a nitro group.

The compounds of this invention are produced by first chloracetylating an aliphatic amine present in excess amount, e. g., a primary amine such as ethylamine or a secondary amine such as diethylamine, with chloracetyl chloride, for example, in a solvent such as ether. The chloracetamide formed in this manner is treated with an excess of a secondary amine, such as di-n-propylamine, in refluxing alcohol in the presence of potassium carbonate. Tertiary amine thus produced is then reacted with a benzyl halide, e. g. benzyl chloride, nitrobenzyl chloride, or chlorobenzyl chloride, in refluxing acetone.

The compounds of this invention are useful as therapeutic agents, particularly as anthelmintic agents, e. g., to combat the organism Syphacia obvelata, and as antiamebic agents, e. g., to combat the organism Endamoeba histolytica. The compounds of this invention are preferably administered orally, e. g., in conventional tablet form.

The following examples are illustrative of the method of synthesizing compounds of this invention. Certain intermediates in the production of the novel compounds of this invention are themselves new, and the method for synthesizing these novel intermediates is also disclosed in the examples which follow. All temperatures are in degrees centigrade.

Example 1

A mixture of 55 g. (0.34 mol) of chloroacetyl piperidine, 300 cc. of ethanol, 68.6 g. (0.68 mol) of di-n-propylamine and 47 g. of potassium carbonate was stirred and refluxed for 22 hours. The solvent was distilled in vacuo and the residue was partitioned between a mixture of 250 cc. of water, 25 cc. of 4 N sodium hydroxide and 200 cc. of ether. The ether solution was dried over sodium sulfate and concentrated in vacuo. (1-Piperidylformylmethyl)dipropylamine was obtained as the residue.

22 g. of (1-piperidylformylmethyl)dipropylamine (0.1 mol) and 23.8 g. (0.11 mol) of p-nitrobenzyl bromide were dissolved in 100 cc. of acetone and the solution was refluxed for 24 hours. The solvent was then removed in vacuo. The residual oil, after being titurated with ether, solidified giving p-nitrobenzyl(1-piperidylformylmethyl)di-n-propylammonium bromide. The product, recrystallized from a mixture of 95% acetone-water and ether, melted at 159–160°.

Example 2

A solution of 28.3 g. (0.25 mol) of chloroacetyl chloride in 200 cc. of ether was added dropwise to a stirred solution of 35.5 g. (0.5 mol) of pyrrolidine in 800 cc.

of ether. The temperature was maintained at 0 to 5° during the addition. The pyrrolidine hydrochloride was removed by filtration and the ether was evaporated in vacuo. The residue, chloroacetylpyrrolidine, was recrystallized from 50 cc. of ether and melted at 40–43°.

(1-pyrrolidylformylmethyl)dipropylamine was prepared by reacting 22 g. of di-n-propylamine with 16 g. of chloroacetyl-pyrrolidine in the presence of 15 g. of potassium carbonate by the procedure described in Example 1 for the synthesis of (1-piperidylformylmethyl)dipropylamine. A solution of 21.2 g. (0.1 mol) of the (1-pyrrolidylformylmethyl)dipropylamine thus obtained and 23.8 g. (0.11 mol) of p-nitrobenzyl bromide in 100 cc. of acetone was refluxed for 48 hours. The product, p-nitrobenzyl-(1-pyrrolidylformylmethyl)di - n - propylammonium bromide, crystallized from the hot reaction mixture. Recrystallized three times from a mixture of acetonitrile and ether, the product melted at 169–171°.

*Example 3*

A solution of 56.5 g. (0.5 mol) of chloroacetyl chloride in 200 cc. of ether was added dropwise to a stirred solution of 87 g. (0.1 mol) of morpholine in 800 cc. of ether. The temperature was maintained at 0 to 5° during the addition. The morpholine hydrochloride was removed by filtration and the ether was evaporated in vacuo. The residue, on distillation through a Vigreaux column, yielded pure 4-(chloroacetyl)morpholine, B. P. 105–107°/0.05 mm.

(4-morpholinylformylmethyl)dipropylamine was prepared by reacting 50.5 g. of di-n-propylamine with 41 g. of 4-(chloroacetyl)morpholine in the presence of 35 g. of potassium carbonate by the procedure described in Example 1 for synthesis of (1-piperidylformylmethyl)-dipropylamine. A solution of 22.8 g. (0.1 mol) of the (4 - morpholinylformylmethyl)dipropylamine thus obtained and 23.8 g. (0.11 mol) of p-nitrobenzyl bromide in 100 cc. of acetone was refluxed for 48 hours. The product, p-nitrobenzyl(4-morpholinylformylmethyl)di-n-propylammonium bromide, crystallized from the hot reaction mixture. Recrystallized three times from a mixture of acetonitrile and ether, the product melted at 175–177°.

*Example 4*

A mixture of 440 g. (2.95 mols) of N,N-diethylchloroacetamide, 1500 cc. of ethanol, 595 g. of di-n-propylamine and 407 g. of potassium carbonate was stirred and refluxed for 22 hours. The inorganic matter was removed by filtration, the filtrate was concentrated in vacuo, and the residue was partitioned between 1 liter of water and 3 liters of ether. The ether solution was washed with 500 cc. of water, dried over sodium sulfate and concentrated in vacuo to obtain (N,N-diethylcarbamylmethyl)-di-propylamine.

A solution of 579 g. (2.7 mols) of (N,N-diethylcarbamylmethyl)di-propylamine and 590 g. (2.73 mols) of p-nitrobenzyl bromide in 2 liters of acetone was stirred and refluxed for 36 hours. P-nitrobenzyl(diethylcarbamylmethyl)di - n - propylammonium bromide crystallized from the hot reaction mixture. The product was first recrystallized from 2 liters of methanol and enough ether to cause turbidity and then recrystallized from a mixture of acetonitrile and ether, M. P. 161–162°.

A solution of 53.5 g. (0.25 mol) of (N,N-diethylcarbamylmethyl)dipropylamine and 43 g. (0.25 mol) of p-nitrobenzyl chloride in 250 cc. of acetone was refluxed for 72 hours. The solvent was evaporated in vacuo and the residue was triturated repeatedly with fresh portions of ether until it solidified. Recrystallized from acetonitrile and ether, the p-nitrobenzyl-(diethylcarbamylmethyl)di-n-propylammonium chloride thus obtained melted at 148–150°.

*Example 5*

A mixture of 14.5 g. (0.068 mol) of (N,N-diethylcarbamylmethyl)di-propylamine, 11.3 g. (0.07 mol) of p-chlorobenzyl chloride, 0.1 g. of sodium iodide and 50 cc. of acetone was refluxed for 64 hours. The turbid solution was clarified by filtration. After evaporation of the solvent from the filtrate the residue was triturated repeatedly with fresh portions of ether until it solidified. Recrystallized from a mixture of acetonitrile and ether, the product, p-chlorobenzyl(diethylcarbamylmethyl)di-n-propylammonium chloride, melted at 128–130°.

*Example 6*

A mixture of 22.5 g. (0.15 mol) of N,N-diethylchloroacetamide, 100 cc. of ethanol, 26 g. (0.30 mol) of morpholine and 20.7 g. of potassium carbonate was stirred and refluxed for 18 hours. The solvent was distilled off in vacuo and the residue was extracted with 200 cc. of methylene chloride. After drying the resulting solution with sodium sulfate and evaporating the solvent in vacuo, 4-diethylcarbamylmethylmorpholine was obtained.

4-diethylcarbamylmethylmorpholine (29.0 g., 0.145 mol) and 31.4 g. (0.145 mol) of p-nitrobenzyl bromide were dissolved in 150 cc. of acetone and the solution was refluxed for 2 hours. The product, 4-(p-nitrobenzyl)-4-(diethylcarbamylmethyl)morpholinium bromide, crystallized from the hot reaction mixture. Recrystallized from a mixture of 95% aqueous acetone and ether, the product melted at 201–202°.

*Example 7*

A mixture of 22.5 g. (0.15 mol) of N,N-diethylchloroacetamide, 20.7 g. (0.15 mol) of potassium carbonate and 125 cc. of a 20% solution of dimethylamine in ethanol was heated in a rocking autoclave at 80° for 16 hours. The cooled reaction mixture was filtered, the solvent and excess dimethylamine were removed in vacuo to obtain as the residue (diethylcarbamylmethyl)dimethylamine.

A solution of 20.0 g. (0.126 mol) of (diethylcarbamylmethyl)-dimethylamine and 27.2 g. (0.126 mol) of p-nitrobenzyl bromide in 150 cc. of acetone was refluxed for 24 hours. The product, p-nitrobenzyl(diethylcarbamylmethyl)dimethylammonium bromide, crystallized from the cooled reaction mixture and was recrystallized from a mixture of 125 cc. of acetonitrile and 75 cc. of ether, M. P. 162–164°.

A sample, recrystallized three times from a mixture of 98% aqueous acetone and ether, had a constant melting point of 115–117°. This material, dried in vacuo at 60°, melted at 163–164° and analyzed for the unsolvated material.

*Example 8*

1 - (diethylcarbamylmethyl)pyrrolidine was prepared by reacting 21.3 g. of pyrrolidine with 22.5 g. of N,N-diethylchloroacetamide in the presence of 20.7 g. of potassium carbonate by the procedure described in Example 1 for the synthesis of (1-piperidylformylmethyl)dipropylamine. A solution of 22.0 g. (0.12 mol) of the 1-diethylcarbamylmethylpyrrolidine thus obtained and 26.0 g. (0.12 mol) of p-nitrobenzyl bromide in 150 cc. of acetone was refluxed for 48 hours. The product, 1-(p-nitrobenzyl) - 1 - (diethylcarbamylmethyl)pyrrolidinium bromide, crystallized from the cooled reaction mixture and was recrystallized from a mixture of acetonitrile and ether. Upon further recrystallization from a mixture of 90% aqueous acetone and ether, the product melted at 167–169°.

*Example 9*

(Diethylcarbamylmethyl)diethylamine was prepared by reacting 21.9 g. of diethylamine with 22.5 g. of N,N-diethylchloroacetamide in the presence of 20.7 g. of potassium carbonate by the procedure described in Example 1 for the synthesis of (1-piperidylformylmethyl)diproplyamine. A solution of 26.5 g. (0.142 mol) of the (diethylcarbamylmethyl)diethylamine thus obtained and 30.7 g. (0.142 mol) of p-nitrobenzyl bromide in 150 cc. of acetone was refluxed for 48 hours. The reaction mixture was diluted with 100 cc. of ether and the product, p-nitrobenzyl(diethylcarbamylmethyl)diethylammonium bromide, crystallized as the monohydrate when the solution was stored in a cool place. Recrystallized from a mixture of 99% aqueous acetone and ether, the product melted at 68–70°.

Example 10

1-(diethylcarbamylmethyl)piperidine was prepared by reacting 25.5 g. of piperidine with 22.5 g. of N,N-diethylchloroacetamide in the presence of 20.7 g. of potassium carbonate by the procedure described in Example 1 for the synthesis of (1-piperidylformylmethyl)dipropylamine. A solution of 30.0 g. of (0.15 mol) of the 1-diethylcarbamylmethyl)piperidine thus obtained and 32.4 g. (0.15 mol) of p-nitrobenzyl bromide in 100 cc. of acetone was refluxed for 2 hours. The product, 1-(p-nitrobenzyl)-1-(diethylcarbamylmethyl)piperidinium bromide, separated from the hot reaction mixture. Recrystallized from a mixture of 98% aqueous acetone and ether, the product melted at 188–190°.

Example 11

N,N-dipropylchloroacetamide was prepared from 50.5 g. (0.5 mol) of di-n-propylamine and 28.3 g. (0.25 mol) of chloroacetyl chloride by the procedure described in Example 2 for the preparation of chloroacetylpyrrolidine.
(N,N-dipropylcarbamylmethyl)dipropylamine was prepared by reacting 48.7 g. of di-n-propylamine with 43 g. of N,N-dipropylchloroacetamide in the presence of 33.8 g. of potassium carbonate by the procedure described in Example 1 for synthesis of (1-piperidylformylmethyl)dipropylamine. A solution of 56 g. (0.23 mol) of the crude (N,N-dipropylcarbamylmethyl)dipropylamine thus obtained and 55 g. (.25 mol) of p-nitrobenzyl bromide in 200 cc. of acetone was refluxed for 48 hours. The solvent was removed in vacuo and the residual oil, after being triturated with ether, yielded solid p-nitrobenzyl(di-n-propylcarbamylmethyl)di-n-propylammonium bromide. Recrystallized three times from a mixture of acetonitrile and ether, the product melted at 146–148°.

Example 12

(N,N-dimethylcarbamylmethyl)dipropylamine was prepared by reacting 24.8 g. of di-n-propylamine with 15 g. of N,N-dimethylchloroacetamide in the presence of 17 g. of potassium carbonate by the procedure described in Example 1 for the synthesis of (1-piperidylformylmethyl)dipropylamine. A solution of 17 g. (0.091 mol) of the (N,N-dimethylcarbamylmethyl)dipropylamine thus obtained and 19.7 g. (0.091 mol) of p-nitrobenzyl bromide in 200 cc. of acetone was refluxed for 72 hours. The product, p-nitrobenzyl(dimethylcarbamylmethyl)di-n-propylammonium bromide, separated when ether was added to the cooled reaction mixture. Recrystallized from acetone, the product melted at 125–127°.

Example 13

(Methylcarbamylmethyl)dipropylamine was prepared by reacting 82 g. of di-n-propylamine with 43.5 g. of N-methyl-α-chloroacetamide in the presence of 56 g. of potassium carbonate by the procedure described in Example 1 for the synthesis of (1-piperidylformylmethyl)-dipropylamine. A solution of 51 g. (0.298 mol) of the (methylcarbamylmethyl)dipropylamine thus obtained and 65 g. (0.298 mol) of p-nitrobenzyl bromide in 500 cc. of acetone was refluxed for 66 hours. The solvent was distilled off in vacuo and the residual oil, after being triturated with ether, yielded solid p-nitrobenzyl(methylcarbamylmethyl)di-n-propylammonium bromide. Recrystallized from a mixture of acetonitrile and ether, the product melted at 158–159°.

Example 14

(Methylcarbamylmethyl)diethylamine was prepared by reacting 29.2 g. of diethylamine with 21.5 g. of N-methyl-α-chloroacetamide in the presence of 27.6 g. of potassium carbonate by the procedure described in Example 1 for the synthesis of (1-piperidylformylmethyl)dipropylamine. A solution of 18 g. (0.125 mol) of the (methylcarbamylmethyl)diethylamine thus obtained and 28 g. (0.13 mol) of p-nitrobenzyl bromide in 200 cc. of acetone was refluxed for 48 hours. The product, p-nitrobenzyl(methylcarbamylmethyl)-diethylammonium bromide, crystallized from the hot reaction mixture. Recrystallized from moist acetonitrile, the product melted at 191–192°.

Example 15

(Methylcarbamylmethyl)dimethylamine was prepared by reacting 100 g. of a 23% solution of dimethylamine in ethanol with 21.5 g. of N-methyl-α-chloroacetamide in the presence of 27.6 g. of potassium carbonate by the procedure described in Example 7 for the synthesis of (diethylcarbamylmethyl)dimethylamine. A solution of 16 g. (0.138 mol) of the (methylcarbamylmethyl) dimethylamine thus obtained and 29.8 g. (0.138 mol) of p-nitrobenzyl bromide in 200 cc. of acetone was refluxed for 20 hours. The product, p-nitrobenzyl(methylcarbamylmethyl)dimethylammonium bromide, crystallized from the hot reaction mixture. The product was first recrystallized from a mixture of 100 cc. of acetonitrile, 2 cc. of water and sufficient ether to produce a slightly turbid solution, and then recrystallized from acetonitrile, M. P. 163–164°.

Example 16

4-(methylcarbamylmethyl)morpholine was prepared by reacting 35 g. of morpholine with 21.5 g. of N-methyl-α-chloroacetamide in the presence of 27.6 g. of potassium carbonate by the procedure described in Example 1 for the synthesis of (1-piperidylformylmethyl)dipropylamine. A solution of 20 g. (0.127 mol) of the 4-(methylcarbamylmethyl)morpholine thus obtained and 28 g. (0.13 mol) of p-nitrobenzyl bromide in 200 cc. of acetone was refluxed for 48 hours. The product, 4-(p-nitrobenzyl)-4-(methylcarbamylmethyl)morpholinium bromide, crystallized from the hot reaction mixture. Recrystallized from moist acetonitrile, the product melted at 195–197°.

Example 17

A mixture of 153 g. (1.26 mols) of N-ethyl-α-chloroacetamide, 1 liter of ethanol, 254 g. (2.52 mols) of di-n-propylamine and 174 g. of potassium carbonate was stirred and refluxed for 22 hours. The inorganic matter was removed by filtration, the filtrate was concentrated in vacuo, and the residue was partitioned between 500 cc. of water and 1 liter of ether. The ether solution was washed with 250 cc. of water, dried over sodium sulfate and concentrated in vacuo to obtain as residue (ethylcarbamylmethyl)dipropylamine.
A solution of 362 g. (1.95 mols) of (ethylcarbamylmethyl)dipropylamine and 420 g. (1.95 mols) of p-nitrobenzyl bromide in 2 liters of acetone was refluxed for 45 hours. The solution was concentrated to about one-third of its original volume, sufficient ether was added to make the solution slightly turbid, and, after being refrigerated for several hours, the product, p-nitrobenzyl-(ethylcarbamylmethyl)di-n-propylammonium bromide, crystallized completely. The crude material was recrystallized from a mixture of 1500 cc. of acetonitrile and enough ether to cause turbidity. Recrystallized from a mixture of acetonitrile and ether, the product melted at 140–142°.

Example 18

(Ethylcarbamylmethyl)diethylamine was prepared by reacting 29.2 g. of diethylamine with 24.3 g. of N-ethyl-α-chloroacetamide in the presence of 27.6 g. of potassium carbonate by the procedure described in Example 1 for the synthesis of (1-piperidylformylmethyl)dipropylamine. A solution of 27 g. (0.171 mol) of the (ethylcarbamylmethyl)diethylamine thus obtained and 37 g. (0.171 mol)

of p-nitrobenzyl bromide was refluxed for 22 hours. The solvent was evaporated in vacuo and the solid product, p - nitrobenzyl(ethylcarbamylmethyl)diethylammonium bromide, was recrystallized from a mixture of acetonitrile and ether, M. P. 160–161°.

Example 19

(Ethylcarbamylmethyl)dimethylamine was prepared by reacting 100 g. of a 23% solution of dimethylamine in ethanol with 24.3 g. of N-ethyl-α-chloroacetamide in the presence of 27.6 g. of potassium carbonate by the procedure described in Example 7 for the synthesis of (diethylcarbamylmethyl)dimethylamine. A solution of 20 g. (0.154 mol) of the (ethylcarbamylmethyl)dimethylamine thus obtained and 33.2 g. (0.154 mol) of p-nitrobenzyl bromide was refluxed for 48 hours. The product, p - nitrobenzyl(ethylcarbamylmethyl)dimethylammonium bromide, crystallized from the hot reaction mixture. Upon recrystallization from a mixture of 98% aqueous acetone and ether, the product melted at 154–155°.

Example 20

4-(ethylcarbamylmethyl)morpholine was prepared by reacting 35 g. of morpholine with 24.3 g. of N-ethyl-α-chloroacetamide in the presence of 27.6 g. of potassium carbonate by the procedure described in Example 1 for the synthesis of (1-piperidylformylmethyl)dipropylamine. A solution of 27 g. (0.157 mol) of the 4-(ethylcarbamylmethyl)morpholine thus obtained and 34 g. (0.157 mol) of p-nitrobenzyl bromide was refluxed for 7 hours. The product, 4-(p-nitrobenzyl)-4-(ethylcarbamylmethyl)morpholinium bromide, crystallized from the hot reaction mixture and was recrystallized from a mixture of acetonitrile and ether, M. P. 179–180°.

Example 21

A solution of 64 g. (0.344 mol) of (ethylcarbamylmethyl)dipropylamine (prepared as in Example 17) and 55.5 g. (0.344 mol) of p-chlorobenzyl chloride in 500 cc. of acetone was refluxed for 96 hours. The solvent was evaporated in vacuo, and the residue, after being triturated repeatedly with fresh portions of ether, yielded crystalline p - chlorobenzyl(ethylcarbamylmethyl)di - n - propylammonium chloride. Recrystallized from a mixture of acetone and ether, the product melted at 142–143°.

Example 22

(Propylcarbamylmethyl)dipropylamine was prepared by reacting 124 g. of di-n-propylamine with 83 g. of N--propyl-α-chloroacetamide in the presence of 85 g. of potassium carbonate by the procedure described in Example 1 for the synthesis of (1-piperidylformylmethyl)dipropylamine. A solution of 50.0 g. (0.25 mol) of the (propylcarbamylmethyl)dipropylamine thus obtained and 54.0 g. (0.25 mol) of p-nitrobenzyl bromide in 310 cc. of acetone was refluxed for 24 hours. The reaction mixture was diluted with 400 cc. of ether and the product, p - nitrobenzyl(n - propylcarbamylmethyl)di - n - propylammonium bromide, crystallized as the hemihydrate when the solution was stored in a cool place. Recrystallized from a mixture of 99% aqueous acetone and ether, this product melted at 106–109° with dec.

Example 23

(Butylcarbamylmethyl)dipropylamine was prepared by reacting 101 g. of di-n-propylamine with 62 g. of N-butyl-α-chloroacetamide in the presence of 57 g. of potassium carbonate by the procedure described in Example 1 for the synthesis of (1-piperidylformylmethyl)dipropylamine. A solution of 77 g. (0.36 mol) of the (butylcarbamylmethyl)dipropylamine thus obtained and 78 g. (0.36 mol) of p-nitrobenzyl bromide in 500 cc. of acetone was refluxed for 70 hours. One-half of the solvent was removed by vacuum distillation and the residue, on cooling, deposited the product, p-nitrobenzyl(n-butylcarbamylmethyl)di-n-propylammonium bromide. After first recrystallizing from a mixture of 200 cc. of acetonitrile and sufficient ether to cause a very slightly turbid solution, and then from a mixture of acetonitrile and ether, the product melted at 146–147°.

Example 24

(Butylcarbamylmethyl)dimethylamine was prepared by reacting 73 g. of diethylamine with 62 g. of N-butyl-α-chloroacetamide in the presence of 57 g. of potassium carbonate by the procedure described in Example 1 for the synthesis of (1-piperidylformylmethyl)dipropylamine. A solution of 56 g. (0.3 mol) of the (butylcarbamylmethyl)diethylamine thus obtained and 65 g. (0.3 mol) of p-nitrobenzyl bromide in 500 cc. of acetone was refluxed for 70 hours. One-half of the solvent was distilled off in vacuo and the residue, on cooling, deposited the product, p-nitrobenzyl(n-butylcarbamylmethyl)diethylammonium bromide. After a first recrystallization from a mixture of 250 cc. of acetonitrile and sufficient ether to cause a very slightly turbid solution, and further recrystallization from a mixture of acetonitrile and ether, the product melted at 142–143°.

Example 25

A solution of 65 g. (0.575 mol) of chloroacetyl chloride in 200 cc. of ether was added dropwise to a stirred solution of 100 g. (1.15 mols) of n-amylamine in 800 cc. of ether. The temperature was maintained at 0–5° during the addition. The n-amylamine hydrochloride was removed by filtration and the ether was evaporated in vacuo. The residue, on distillation through a short Vigreaux column, yielded pure N-amyl-α-chloroacetamide, B. P. 78–80°/0.1 mm.

(Amylcarbamylmethyl)dipropylamine was prepared by reacting 25.2 g. of di-n-propylamine and 20 g. of N-amyl-α-chloroacetamide in the presence of 16.8 g. of potassium carbonate by the procedure described in Example 1 for the synthesis of (1-piperidylformylmethyl)dipropylamine. A solution of 28 g. (0.122 mol) of the (amylcarbamylmethyl)dipropylamine thus obtained and 26.4 g. (0.122 mol) of p-nitrobenzyl bromide in 200 cc. of acetone was refluxed for 48 hours. The solvent was evaporated in vacuo, and the residue solidified after being triturated repeatedly with fresh portions of ether. This product, p-nitrobenzyl(n-amylcarbamylmethyl)di-n-propylammonium bromide, was recrystallized from a mixture of 100 cc. of acetonitrile and 200 cc. of ether, M. P. 147–149°.

Example 26

N-hexyl-α-chloroacetamide, B. P. 95–105°/0.2 mm., was prepared from 202 g. (2.0 mols) of n-hexylamine and 113 g. (1.0 mol) of chloroacetyl chloride by the procedure described in Example 25 for the synthesis of N-amyl-α-chloroacetamide.

(Hexylcarbamylmethyl)dipropylamine was prepared by reacting 24.2 g. of di-n-propylamine with 21.3 g. of N-hexyl-α-chloroacetamide in the presence of 16.5 g. of potassium carbonate by the procedure described in Example 1 for the synthesis of (1-piperidylformylmethyl)-dipropylamine. A solution of 29.7 g. (0.12 mol) of the (hexylcarbamylmethyl)dipropylamine thus obtained and 26.4 g. (0.12 mol) of p-nitrobenzyl bromide in 200 cc. of acetone was refluxed for 24 hours. The solvent was evaporated in vacuo and the residue solidified after being triturated repeatedly with fresh portions of ether. This crude product, p-nitrobenzyl(n-hexylcarbamylmethyl)di-n-propylammonium bromide, was recrystallized from a mixture of acetone and ether, M. P. 142–144°.

Example 27

A solution of 50 g. (0.347 mol) of (methylcarbamylmethyl)diethylamine, prepared as described in Example 14, and 62 g. (0.347 mol) of p-chlorobenzyl chloride in 250 cc. of nitromethane was refluxed for 48 hours. The solvent was distilled off in vacuo and the residue, on trituration with ether, set to a crystalline mass. Recrystallized form a mixture of acetonitrile and ether, the product, p - chlorobenzyl(methylcarbamylmethyl)diethylammonium chloride, melted at 152–153°.

Example 28

A solution of 14.5 g. (0.06 mol) of (hexylcarbamylmethyl)dipropylamine, prepared as described in Example 26, 9.7 g. (0.06 mol) of p-chlorobenzyl chloride and 9.0 g. (0.06 mol) of sodium iodide in 200 cc. of acetone was stirred and refluxed for 42 hours. The sodium chloride which was formed in the reaction was removed by filtration, the filtrate was concentrated to 35 cc. in vacuo, ether was added to turbidity, and the solution was refrigerated. The product, p-chlorobenzyl(n-hexylcarbamylmethyl)di-n-propylammonium iodide, crystallized from the cold solution. Recrystallized from a mixture of acetone and ether, the product melted at 95–97°.

Example 29

(n-Hexylcarbamylmethyl)diethylamine was prepared by reacting 17.8 g. of diethylamine with 35.5 g. of N-hexyl-α-chloroacetamide (prepared as described in Example 26) in the presence of 27.6 g. of potassium carbonate by the procedure described in Example 1 for the synthesis of (1 - piperidylformylmethyl)dipropylamine. The (n-hexylcarbamylmethyl)diethylamine thus obtained was dissolved in 200 cc. of acetone, 43.2 g. of p-nitrobenzyl bromide was added, and the solution was refluxed for 48 hours. The cooled reaction mixture was diluted with 1 liter of ether and the product, p-nitrobenzyl(n-hexylcarbamylmethyl)diethylammonium bromide, crystallized. Recrystallized from a mixture of ethanol and ether, the product melted at 125–126°.

Example 30

(n-Hexylcarbamylmethyl)dimethylamine was prepared by reacting 150 cc. of a 20% solution of dimethylamine in ethanol with 35.5 g. of N-hexyl-α-chloroacetamide (prepared as described in Example 26) in the presence of 27.6 g. of potassium carbonate by the procedure described in Example 7 for the synthesis of (diethylcarbamylmethyl)dimethylamine. The (n - hexylcarbamylmethyl)dimethylamine thus obtained was dissolved in 200 cc. of acetone, 43.2 g. of p-nitrobenzyl bromide was added, and the solution was refluxed for 48 hours. The cooled reaction mixture was diluted with 750 cc. of ether and the product, p-nitrobenzyl(n-hexylcarbamylmethyl)-dimethylammonium bromide, crystallized. Recrystallized from a mixture of ethanol and ether, the product melted at 130–131°.

We claim:

1. A compound of the group consisting of those having the formula

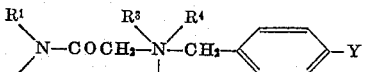

wherein

represents a member of the group consisting of lower alkylamino, di-lower alkylamino, pyrrolidino, morpholino and piperidino radicals,

represents a member of the group consisting of di-lower alkylamino, pyrrolidino, morpholino and piperidino radicals, X represents a halogen, and Y represents a member of the group consisting of halogen and nitro.

2. Lower alkyl—NH—COCH₂—N(lower alkyl)(lower alkyl)—CH₂—C₆H₄—NO₂, with halogen substituent on N.

3. (Lower alkyl)(Lower alkyl)N—COCH₂—N(lower alkyl)(lower alkyl)—CH₂—C₆H₄—NO₂, with halogen.

4. Lower alkyl—NH—COCH₂—N(lower alkyl)(lower alkyl)—CH₂—C₆H₄—halogen, with halogen.

5. (Lower alkyl)(Lower alkyl)N—COCH₂—N(lower alkyl)(lower alkyl)—CH₂—C₆H₄—halogen, with halogen.

6. p - Nitrobenzyl(methylcarbamylmethyl)diethylammonium bromide.

7. p - Nitrobenzyl(hexylcarbamylmethyl)dipropylammonium bromide.

8. p - Nitrobenzyl(diethylcarbamylmethyl)di-n-propylammonium bromide.

References Cited in the file of this patent

UNITED STATES PATENTS

| | | |
|---|---|---|
| 2,139,190 | Iselin et al. | Dec. 6, 1938 |
| 2,317,999 | Leuchs | May 4, 1943 |
| 2,411,662 | Martin et al. | Nov. 26, 1946 |
| 2,654,754 | Bruce et al. | Oct. 6, 1953 |